(12) United States Patent
Zhang (10) Patent No.: US 6,779,952 B2
(45) Date of Patent: Aug. 24, 2004

(54) STEPLESS SPEED CHANGE BENCH DRILL

(76) Inventor: Weidong Zhang, No. 39, Longshan Road, Tengzhou City, Shandong Province, 277500 (CN)

( * ) Notice: Subject to any disclaimer, the term of this patent is extended or adjusted under 35 U.S.C. 154(b) by 227 days.

(21) Appl. No.: 10/223,314

(22) Filed: Aug. 19, 2002

(65) Prior Publication Data

US 2003/0053871 A1 Mar. 20, 2003

(30) Foreign Application Priority Data

Sep. 20, 2001 (CN) .................................... 01261750 U
Sep. 20, 2001 (CN) .................................... 01261752 U (51) Int. Cl.[7] .............................. B23G 3/00; F16H 9/12
(52) U.S. Cl. ......................... 408/128; 474/27; 474/79
(58) Field of Search ...................... 408/6, 9, 16, 124, 408/128; 474/27, 59, 79, 87

(56) References Cited

U.S. PATENT DOCUMENTS

| | | | | |
|---|---|---|---|---|
| 1,126,322 A | * | 1/1915 | Warren | 474/27 |
| 1,443,782 A | * | 1/1923 | Balcker | 474/27 |
| 2,170,502 A | * | 8/1939 | Martellotti | 476/53 |
| 2,248,948 A | * | 7/1941 | Bowers | 474/27 |
| 2,267,238 A | * | 12/1941 | Irwin | 474/27 |
| 2,594,663 A | * | 4/1952 | Lindell | 474/27 |
| 2,619,842 A | * | 12/1952 | Felix | 474/26 |
| 2,666,332 A | * | 1/1954 | Phares | 474/27 |
| 2,887,894 A | * | 5/1959 | Charlat | 474/28 |
| 3,146,628 A | * | 9/1964 | Diehl et al. | 474/29 |
| 3,314,312 A | * | 4/1967 | Niehaus, Jr. | 408/128 |
| 3,718,405 A | * | 2/1973 | Keiter et al. | 408/128 |
| 3,762,830 A | * | 10/1973 | Pettigrew | 408/135 |
| 4,209,273 A | * | 6/1980 | Lehnen | 408/9 |
| 5,061,124 A | * | 10/1991 | Chen | 408/135 |
| 5,186,088 A | * | 2/1993 | Wixey | 82/142 |
| 5,567,094 A | * | 10/1996 | Chung | 409/183 |
| 6,203,458 B1 | * | 3/2001 | Chang | 474/40 |
| 6,398,678 B1 | * | 6/2002 | Chin-Feng | 474/29 |

\* cited by examiner

Primary Examiner—Daniel W. Howell
Assistant Examiner—Brian D. Walsh
(74) Attorney, Agent, or Firm—Christopher Darrow, Esq.; Greenberg Traung, LLP (57) ABSTRACT

This invention relates to stepless speed change bench drill, comprising a pedestal, a vertical post mounted on the pedestal, a worktable and a cabinet mounted on the vertical post, a driving shaft and a main shaft mounted on the upper portion of the cabinet, a motor for transmitting power to the driving shaft, a motor movable wheel and a motor stationary wheel mounted on the driving shaft, and a main shaft movable wheel and a main shaft stationary wheel mounted on the main shaft, a speed regulation shaft provided with a threaded section and mounted between the driving shaft and the main shaft, the threaded section is engaged with a threaded hole formed on a bearing block, the bearing block is simultaneously mounted on the main shaft, the speed regulation shaft is rotated by a speed regulation hand wheel.

10 Claims, 8 Drawing Sheets

STEPLESS SPEED CHANGE BENCH DRILL

FIELD OF THE INVENTION

The present invention relates to a machining apparatus, and more particularly, to a stepless speed change bench drill.

DESCRIPTION OF THE PRIOR ART

Presently, various bench drills being available in the market all employ a tower-type belt pulley to regulate the rotating speed thereof. When requiring changing the speed, the drill has to be stopped to open the belt housing, then the belt is moved from one groove to another groove of the belt pulley so as to increase or decrease the speed. Such speed regulation has disadvantages that the operation is complicated and unsafe, and the efficiency is low. In addition, due to the limit of the groove of the tower pulley, only step speed change such as 5 speeds and 12 speeds can be achieved. In order to achieve the stepless speed change, the skilled person in the art have made great efforts to design the stepless speed change bench drill. The Chinese patent No. 97206964.X disclosed a stepless speed change bench drill. However, since this bench drill is complicated in the speed regulation structure and limited in the range of the speed regulation, it has not been produced really. The same applicant of the present invention applied a stepless speed change bench drill and a speed regulation device in March 2001 and June 2001 respectively. Though stepless speed regulation is achieved and there are a plurality of advantages, it is tested by a number of experiments recently that the bench drill and the speed regulation device still have some shortcomings that continuous speed change and uninterrupted speed change can not be achieved, the accuracy of the speed change and the self locking state after speed change are not good enough, so that it is difficult to meet the requirements of exiguous speed change.

SUMMARY OF THE INVENTION

An object of the invention is to provide a stepless speed change bench drill, which has the following advantages: the operation of the speed change is simple, short-cut and labor saving, the drill does not need to be stopped at the time of speed change, the speed change is accurate, the effect of the self locking after speed change is good, and it can meet the requirements of constant power within the largest range of the speed change and can achieve continuous and uninterrupted speed change.

The above and other objects of the invention is accomplished by providing a stepless speed change bench drill comprising a pedestal, a vertical post mounted on the pedestal, a worktable and a cabinet mounted on the vertical post, a driving shaft and a main shaft which are mounted on the upper portion of the cabinet, a motor for transmitting power to the driving shaft, a motor movable wheel and a motor stationary wheel which are mounted on the driving shaft, and a main shaft movable wheel and a main shaft stationary wheel which are mounted on the main shaft, wherein a speed regulation device is provided between the driving shaft and the main shaft, the speed regulation device comprises a speed regulation shaft provided with a threaded section, the threaded section is engaged with a threaded hole formed on a bearing block, the bearing block is simultaneously mounted on the main shaft, the speed regulation shaft is rotated by a speed regulation hand wheel.

A driven bevel gear is mounted on the lower end of the speed regulation shaft, the driven bevel gear is engaged with a driving bevel gear, the speed regulation hand wheel is fixedly connected to the driving bevel gear.

A threaded hole and an unthreaded hole are provided on the bearing block.

A groove is provided on the edge of the main shaft stationary wheel.

A digital display sensor is mounted on the edge of the main shaft stationary wheel, the digital display sensor is connected to a printed circuit board via a lead, and a digital display screen is connected to the printed circuit board.

A switch box is mounted on the cabinet, and the display screen is mounted on the switch box.

A shifting fork body is mounted on the speed regulation shaft of the speed regulation device, the shifting fork body is connected to the speed regulation shaft via thread, the lower shifting fork of the shifting fork body may be formed integrally with the shifting fork body, the upper shifting fork is mounted on the upper end of the shifting fork body by fastener.

The speed regulation device further comprises a transition means mounted between the driving shaft and the speed regulation shaft, the transition means comprises a middle shaft mounted on the cabinet, a lower movable wheel, a stationary wheel set and an upper movable wheel which are mounted on the middle shaft, a belt is provided between the driving shaft and the middle shaft, and between the middle and main shaft is also provided a belt.

The upper shifting fork of the shifting fork body on the speed regulation device is mounted on an upper bearing block, the lower shifting fork of the shifting fork body is mounted on a lower bearing block.

A digital display sensor is mounted on the outer edge of the main shaft stationary wheel, the digital display sensor is connected to a printed circuit board via a lead, a digital display screen is connected to the printed circuit board.

This invention has the following advantages tested by a number of experiments. The operation of the speed change is simple, short-cut and labor saving, the drill does not need to be stop at the time of speed change, the speed change is accurate, the effect of the self locking after speed change is good, and it can meet the requirements of constant power within the largest range of the speed change and can achieve continuous speed change and uninterrupted speed change. The speed regulation can be displayed accurately, the speed regulation hand wheel can regulate the speed within a range of more than 360 degrees. And the production cost thereof is low.

DETAILED DESCRIPTION OF PREFERRED EMBODIMENTS

Referring to FIGS. 1 to 5, the reference number 19 denotes a pedestal, a vertical post 18 is mounted on the pedestal 19, a worktable 17 and a cabinet 16 are mounted on the vertical post 18, a driving shaft 2 and a main shaft are mounted on the upper portion of the cabinet 16, a motor 1 supplies power to the driving shaft 2. A motor movable wheel 4 and a motor stationary wheel 5 are mounted on the driving shaft 2. On the main shaft 24 are mounted a main shaft stationary wheel 12 and main movable wheel 11. There is provided a speed regulation device between the driving shaft 2 and the main shaft 24, the speed regulation device comprises a speed regulation shaft 9 provided with a threaded section 31. The threaded section 31 of the speed regulation shaft 9 is engaged with a threaded hole 25 on a bearing block 10, the bearing block 10 is mounted on the main shaft 24 simultaneously, the speed regulation shaft 9 is rotated by a speed regulation hand wheel 15. A driven bevel gear 20 is mounted on the lower end of the speed regulation shaft 9, the driven bevel gear 20 is engaged with a driving bevel gear 23, the speed regulation hand wheel 15 is fixedly connected to the driving bevel gear 23. A threaded hole 25 and an unthreaded hole 26 are provided on the bearing block 10. A groove 27 is provided on the edge of the main shaft stationary wheel 12. A digital display sensor 13 is mounted on the edge of the main shaft stationary wheel 12, the digital display sensor 13 is connected to a printed circuit board 30 via a lead 28, and a digital display screen 29 is connected to the printed circuit board 30. A switch box 14 is mounted on the cabinet 16, and the display screen 29 is mounted on the switch box 14.

Figure 1:
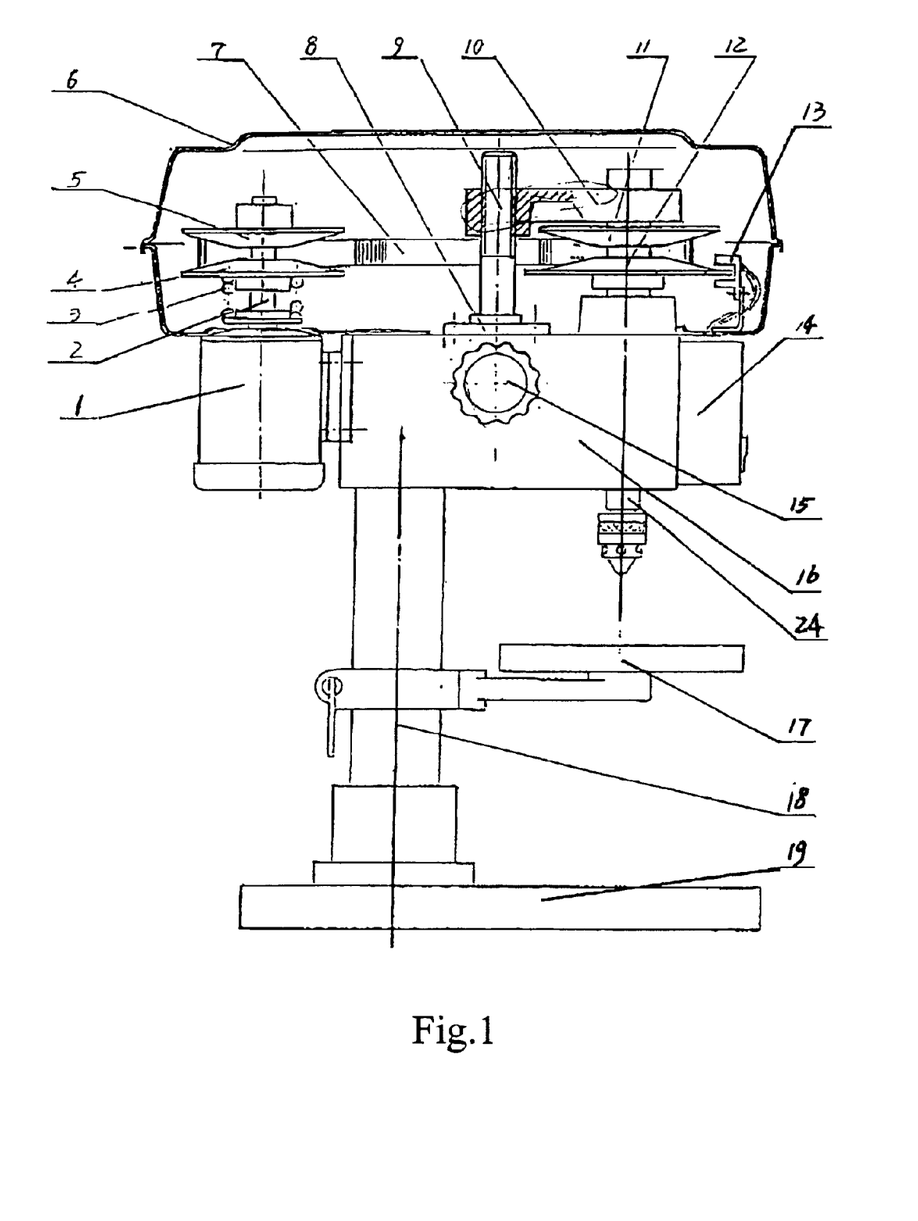
FIG. 1 is a schematic view showing the structure of the invention.
Figure 2:
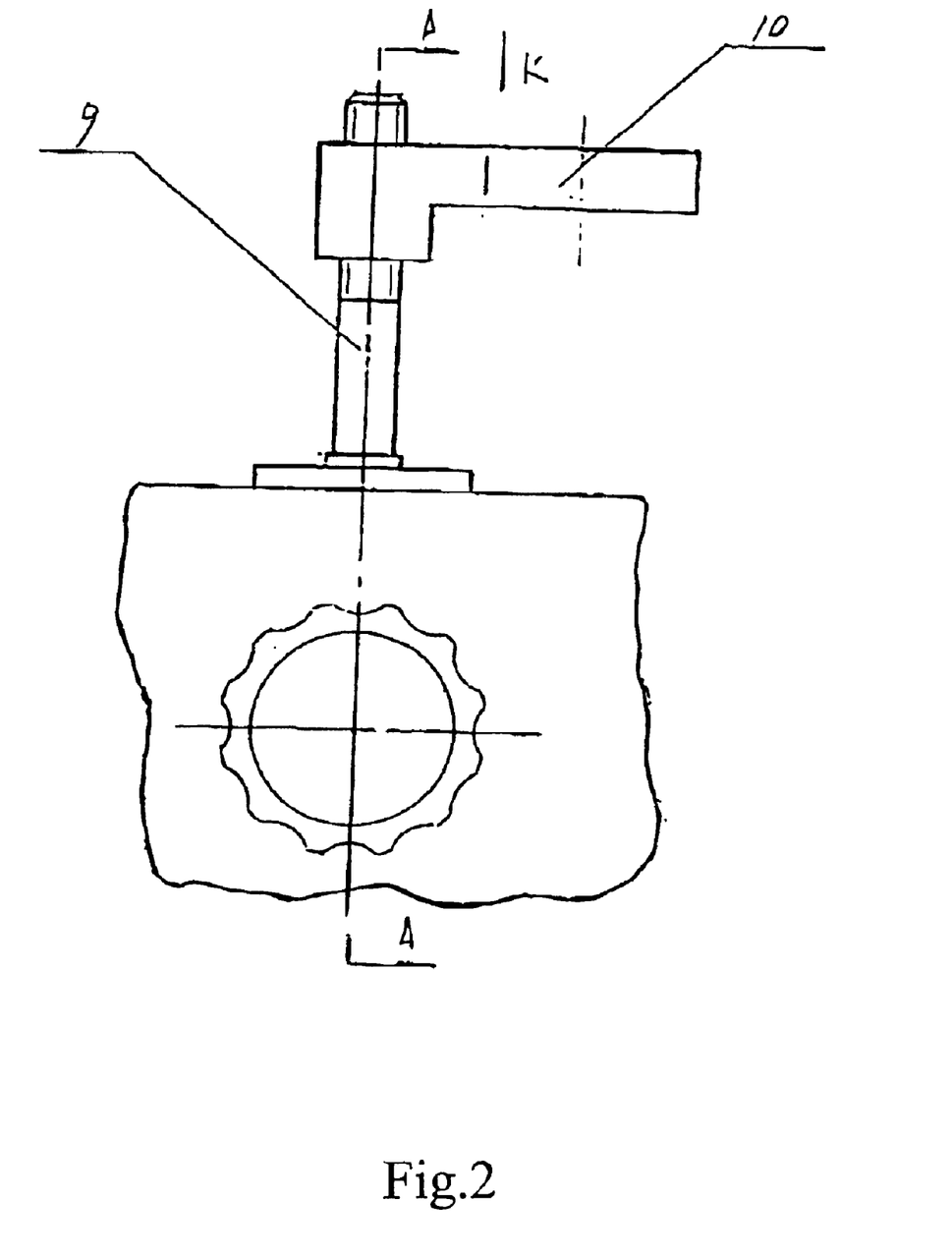
FIG. 2 is an enlarged schematic view of the speed regulation shaft in FIG. 1, mainly showing the speed regulation structure schematically.

In this invention, the speed regulation shaft 9 only rotates and does not move up and down. The self-locking after speed regulation can be achieved easily by using the threaded section 31 of the speed regulation shaft 9, and exiguous speed regulation can be also achieved. There are many ways to rotate the speed regulation shaft 9, for instance, a speed regulation handle can be mounted directly at the lower end of the speed regulation shaft 9, however, this structure can not ensure safe operation. The structure disclosed by the invention is reasonable and can ensure safe and convenient operation.

Figure 3:
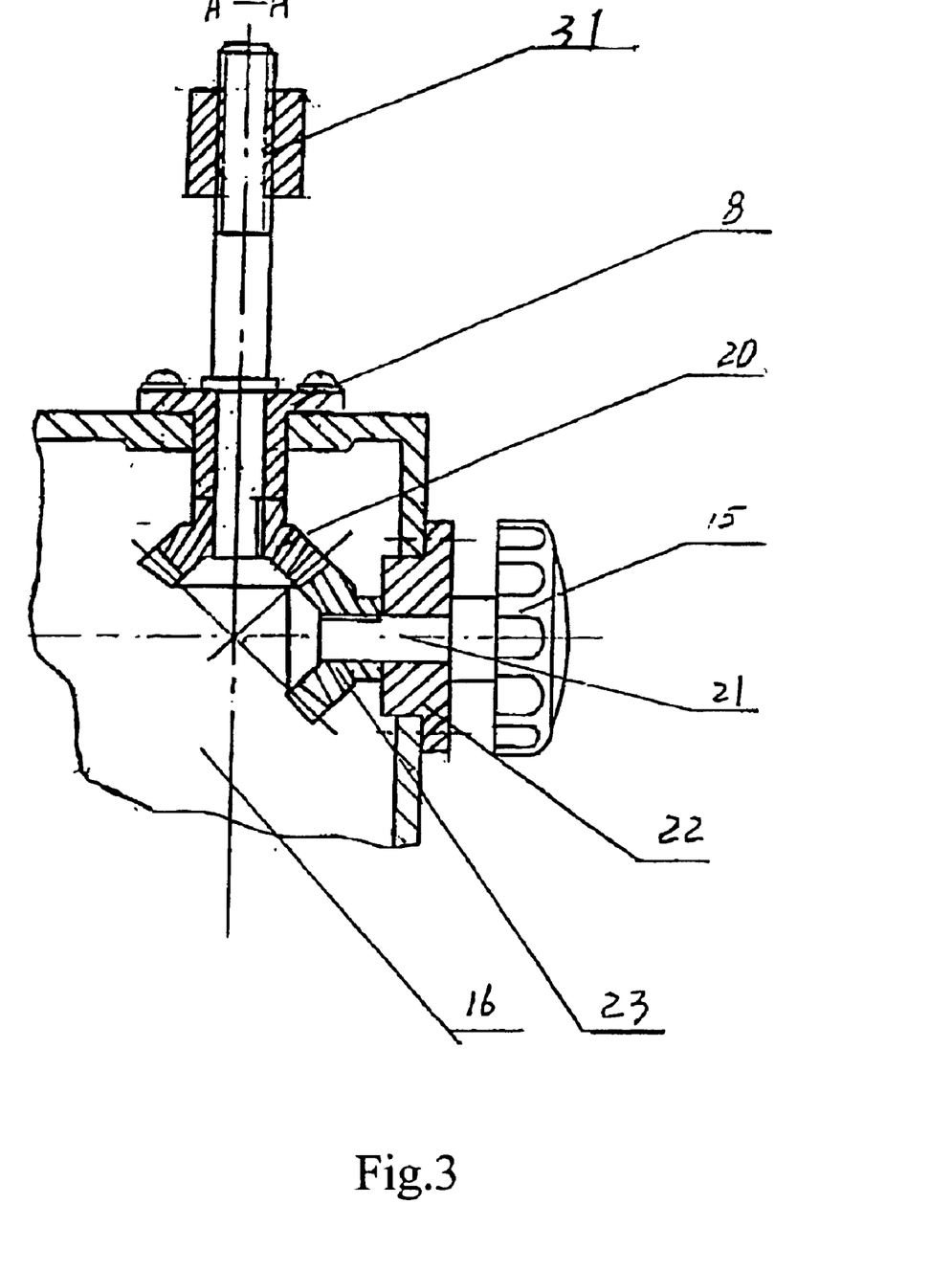
FIG. 3 is an enlarged schematic structural section view taken along line A—A in FIG. 2.
Figure 4:
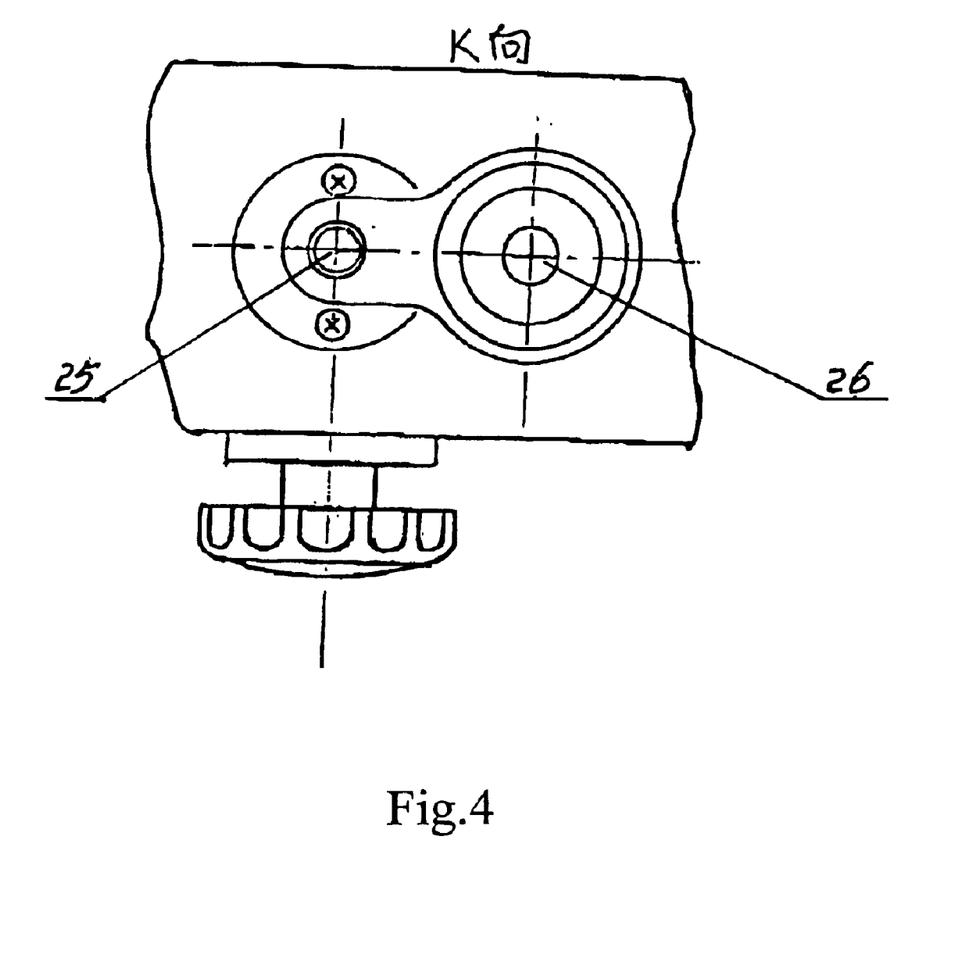
FIG. 4 is a schematic structural view seen in the K direction in FIG. 2.
Figure 5:
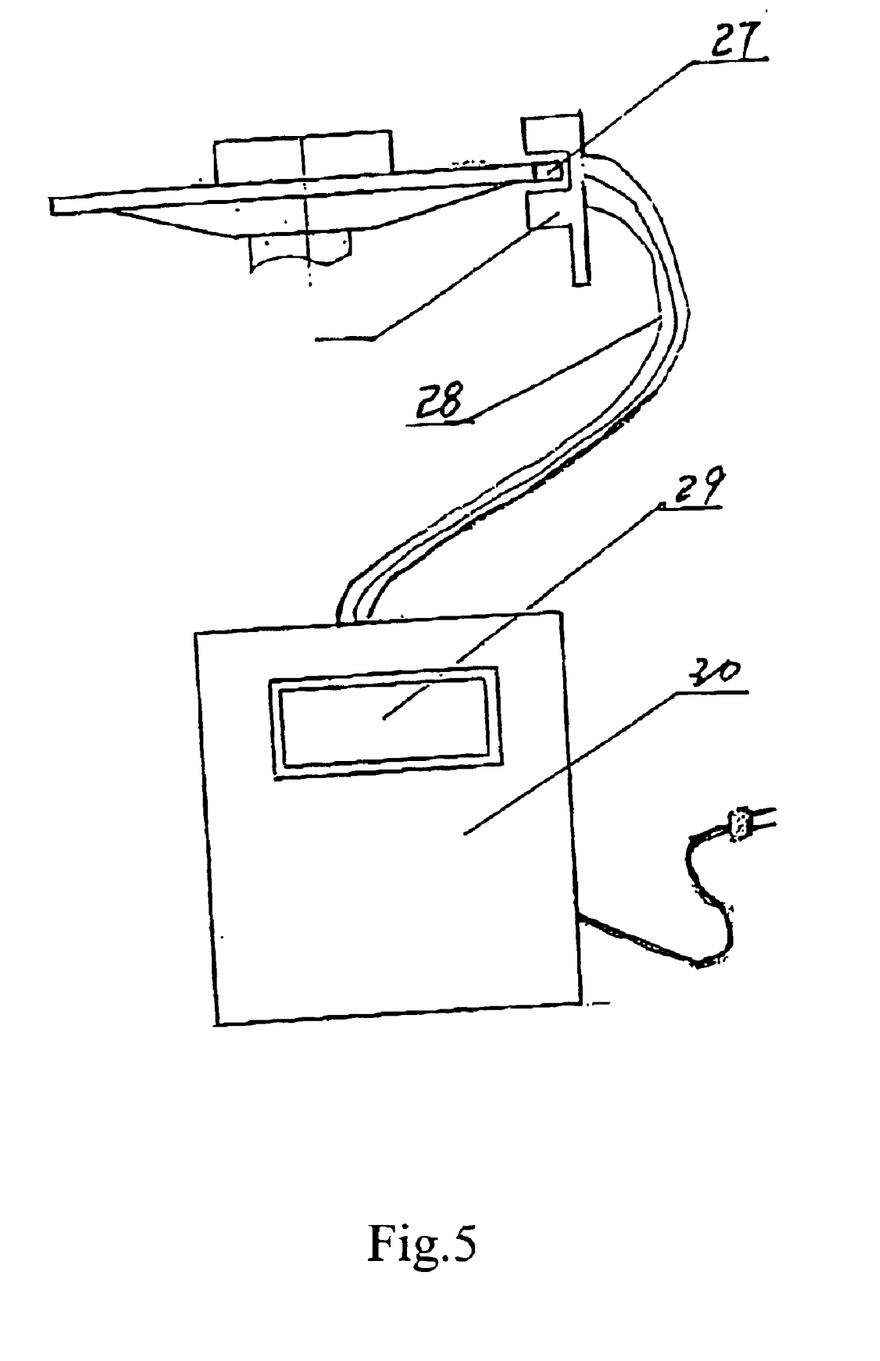
FIG. 5 is a schematic view of the digital display structure.

When requiring the speed regulation, the speed regulation hand wheel 15 is rotated, so that the speed regulation shaft 9 is rotated via the driving bevel gear 23 and the driven bevel gear 20, since the speed regulation shaft 9 is engaged with the threaded hole 25 on the bearing block 10, the bearing block 10 can be moved up and down by the rotation of the speed regulation shaft 9, thus changing the contact diameter between the belt 7 and the main shaft movable wheel 11 and the main shaft stationary wheel 12, at this time, the contact diameter between the belt 7 and the motor movable wheel 4 and the motor stationary wheel 5 is also changed, therefore, the rotation speed of the main shaft 24 is changed. In the present invention, the rotation of the speed regulation hand wheel 15 is continuous, the rotation of the speed regulation shaft 9 is also continuous, so that the up and down movement of the bearing block 10 is also continuous and the change of the driving diameter of the belt 7 contacting the main shaft movable wheel 11 and the main shaft stationary wheel 12 is also continuous. Therefore, the speed of the main shaft 24 can be regulated continuously, thus achieving stepless speed change really, in addition, the speed change can be carried out within a range of 360 degrees. In the present invention, the electric circuits being used are conventional, so that their detailed descriptions are omitted. In FIG. 3, the reference number 3 denotes a spring, 6 denotes a protective casing and 8 denotes a supporting seat.

Figure 6:
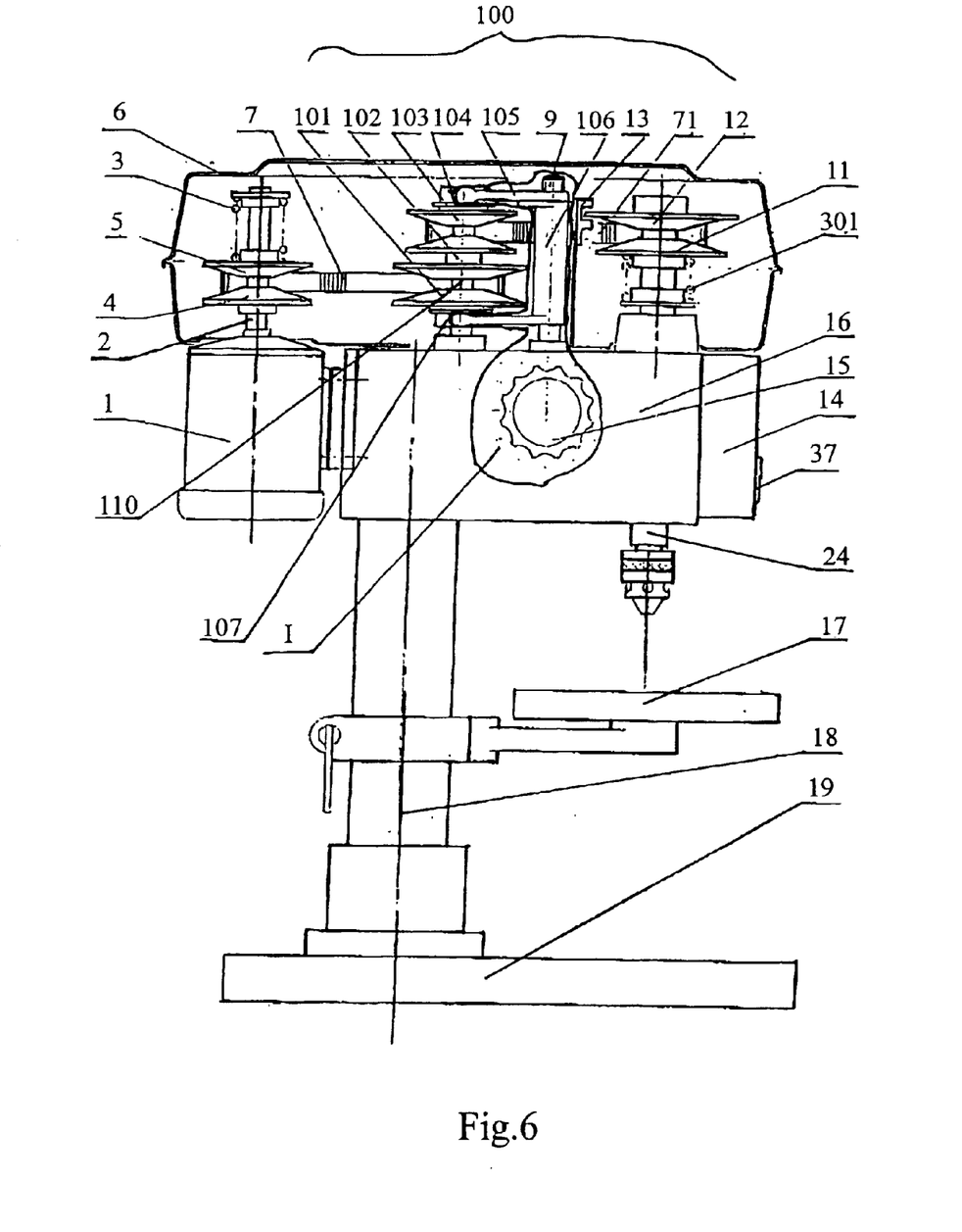
FIG. 6 is a schematic structural view of another embodiment according to the invention.
Figure 7:
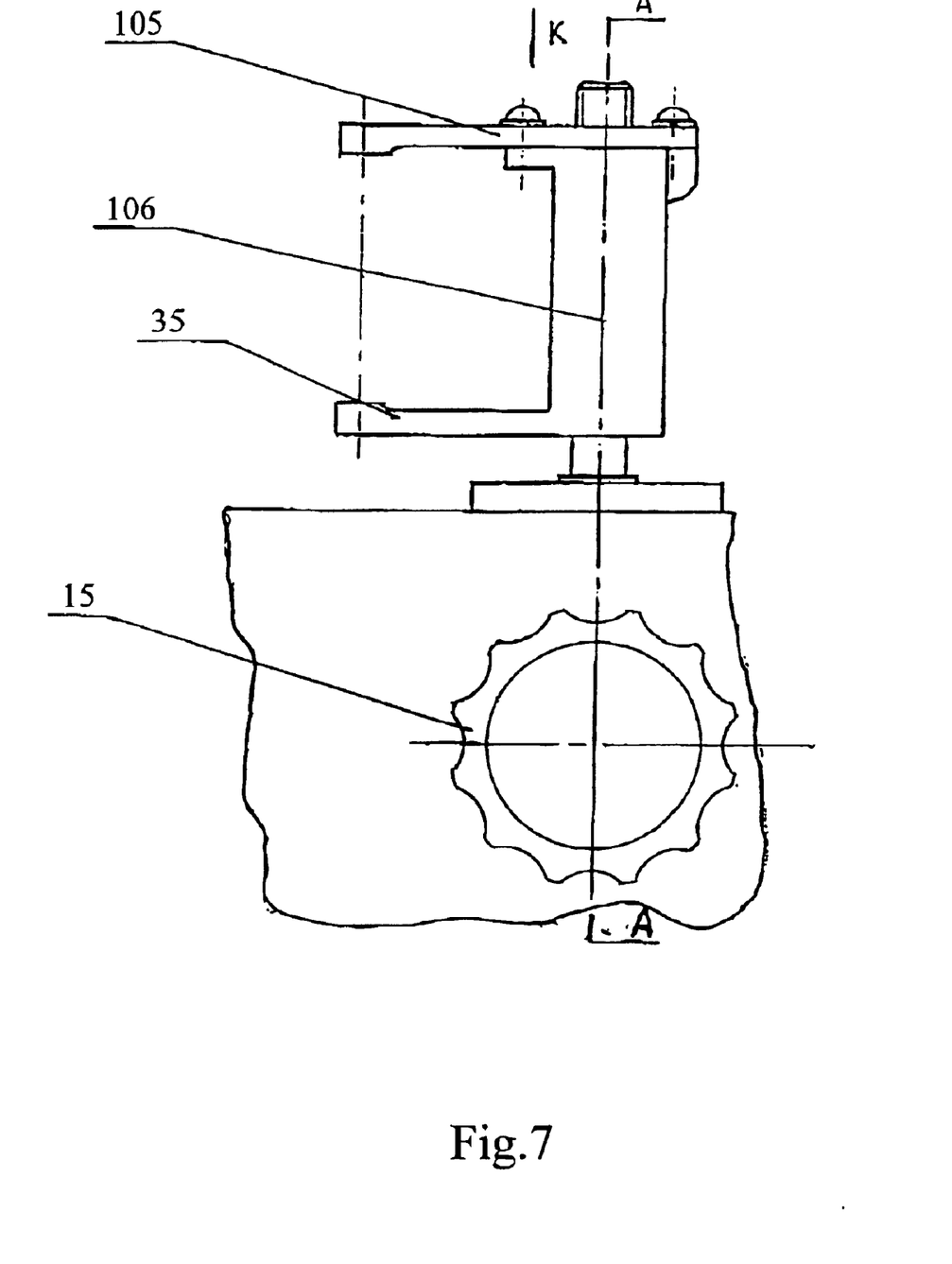
FIG. 7 is an enlarged schematic structural view of the I portion in FIG. 6.
Figure 8:
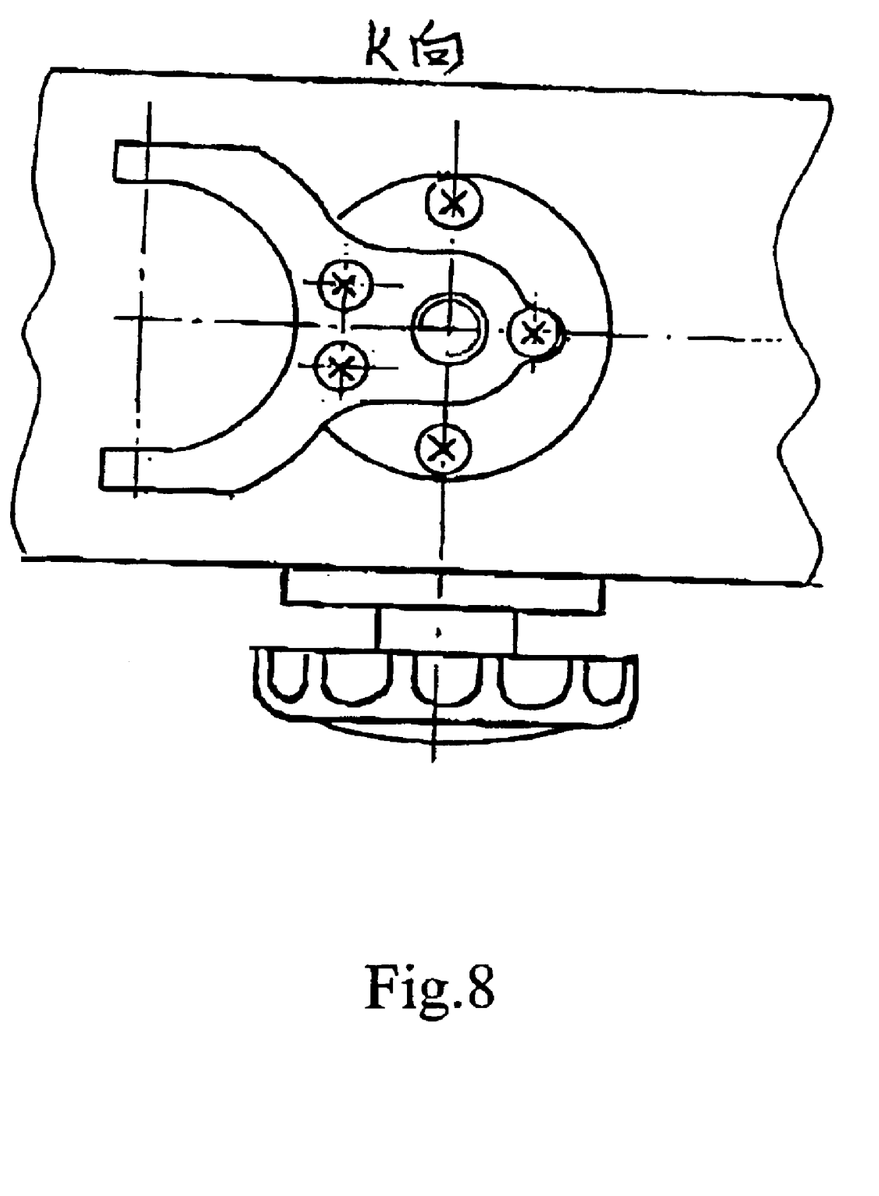
FIG. 8 is a schematic structural view seen in the K direction in FIG. 7.

Referring to FIGS. 6 to 8, the second embodiment of the present invention is shown, in which the same number denotes the similar partto the first embodiment, and the descriptions of the portions identical with the first embodiment are omitted. In the second embodiment, a shifting fork body 106 is mounted on the speed regulation shaft 9 of the speed regulation device, the shifting fork body 106 is connected to the speed regulation shaft 9 via thread, the lower shifting fork 35 of the shifting fork body 106 can be formed integrally with the shifting fork body 106, the upper shifting fork 105 is mounted on the upper end of the shifting fork body 106 by fastener. The speed regulation device further comprises a transition means 100 mounted between the driving shaft 2 and the speed regulation shaft 9, the transition means 100 comprises a middle shaft 110 mounted on the cabinet 16, a lower movable wheel 101, a stationary wheel set 102 and an upper movable wheel 103 which are mounted on the middle shaft 110, a belt 7 is provided between the driving shaft 2 and the middle shaft 110, and between the middle shaft 110 and main shaft 24 is also provided a belt 71. The upper shifting fork 105 of the shifting fork body 106 is mounted on an upper bearing block 104, the lower shifting fork 35 of the shifting fork body 106 is mounted on a lower bearing block 107. A digital display sensor 13 is mounted on the outer edge of the main shaft stationary wheel 12, the positions of the main shaft stationary wheel 12 and the main shaft movable wheel 11 are contrary to that in the first embodiment in vertical direction, the digital display sensor 13 is connected to a printed circuit board 30 via a lead 28, a digital display screen 29 is connected to the printed circuit board 30.

The stepless speed change can be also achieved according to the second embodiment of the present invention.

What is claimed is:
1. A stepless speed change bench drill, comprising:
a pedestal (19);
a vertical post (18) mounted on said pedestal (19);
a worktable (17) and a cabinet (16) which are mounted on said vertical post (18);
a driving shaft (2) and a main shaft (24) which are mounted on an upper portion of said cabinet (16);
a motor (1) for transmitting power to said driving shaft (2);
a motor movable wheel (4) and a motor stationary wheel (5) which are mounted on said driving shaft (2); and
a main shaft movable wheel (11) and a main shaft stationary wheel (12) which are mounted on said main shaft (24),
wherein a speed regulation device is provided between the driving shaft and the main shaft, said speed regulation device comprises a speed regulation shaft (9) provided with a threaded section (31), said threaded section (31) is engaged with a threaded hole (25) formed on a bearing block (10), said bearing block (10) is simultaneously mounted on the main shaft (24), said speed regulation shaft (9) is rotated by a speed regulation hand wheel (15).
2. The stepless speed change bench drill according to the claim 1, wherein a driven bevel gear (20) is mounted on the lower end of said speed regulation shaft (9), said driven bevel gear (20) is engaged with a driving bevel gear (23), said speed regulation hand wheel (15) is fixedly connected to the driving bevel gear (23).

3. The stepless speed change bench drill according to the claim 1, wherein A threaded hole (25) and an unthreaded hole (26) are provided on said bearing block (10).

4. The stepless speed change bench drill according to the claim 1, wherein a groove (27) is provided on the edge of said main shaft stationary wheel (12).

5. The stepless speed change bench drill according to the claim 1, wherein a digital display sensor (13) is mounted on the edge of said main shaft stationary wheel (12), said digital display sensor (13) is connected to a printed circuit board (30) via a lead (28), and a digital display screen (29) is connected to said printed circuit board (30).

6. The stepless speed change bench drill according to the claim 1, wherein a switch box (14) is mounted on said cabinet 16, and a display screen (29) is mounted on said switch box (14).

7. The stepless speed change bench drill according to the claim 1, wherein a shifting fork body (106) is mounted on said speed regulation shaft (9) of the speed regulation device, said shifting fork body (106) is connected to said speed regulation shaft (9) via thread, the lower shifting fork (35) of said shifting fork body (106) can be formed integrally with said shifting fork body (106), the upper shifting fork (105) is mounted on the upper end of said shifting fork body (106) by fastener.

8. The stepless speed change bench drill according to the claim 7, wherein said speed regulation device further comprises a transition means (100) mounted between said driving shaft (2) and said speed regulation shaft (9); said transition means (100) comprises a middle shaft (110) mounted on said cabinet (16), a lower movable wheel (101), a stationary wheel set (102) and an upper movable wheel (103) which are mounted on said middle shaft (110); a belt (7) is provided between said driving shaft (2) and said middle shaft (110), and between said middle shaft (110) and main shaft (24) is also provided a belt (71).

9. The stepless speed change bench drill according to the claim 8, wherein an upper shifting fork (105) of the shifting fork body (106) is mounted on an upper bearing block (104), and a lower shifting fork (35) of said shifting fork body (106) is mounted on a lower bearing block (107).

10. The stepless speed change bench drill according to the claim 8, wherein a digital display sensor (13) is mounted on the outer edge of said main shaft stationary wheel (12), said digital display sensor (13) is connected to a printed circuit board (30) via a lead (28), a digital display screen (29) is connected to said printed circuit board (30).

* * * * *